United States Patent

Heo et al.

[11] Patent Number: 6,141,479
[45] Date of Patent: Oct. 31, 2000

[54] GE-GA-S-BASED GLASS COMPOSITION HAVING LIGHT AMPLIFYING CHARACTERISTIC AND APPARATUS FOR OPTICAL COMMUNICATIONS USING THE SAME

[75] Inventors: Jong Heo, Pohang; Se-ho Park, Seoul; Dong-wook Shin, Suwon; Hyoun-soo Kim, Sungnam, all of Rep. of Korea

[73] Assignee: SamSung Electronics Co., Ltd., Suwon, Rep. of Korea

[21] Appl. No.: 09/185,747

[22] Filed: Nov. 4, 1998

[30] Foreign Application Priority Data

Nov. 4, 1997 [KR] Rep. of Korea ............ 97-57995

[51] Int. Cl.[7] .................. G02B 6/00; H01S 3/30; H01S 3/00; C03C 13/04
[52] U.S. Cl. ............ 385/141; 385/142; 385/123; 372/6; 359/341; 501/37; 501/42; 501/140; 501/152; 501/94
[58] Field of Search ............ 385/123, 141, 385/142, 144; 372/6; 359/341, 342, 343, 345; 501/11, 37, 41, 42, 50, 94, 152, 140

[56] References Cited

U.S. PATENT DOCUMENTS

| | | | |
|---|---|---|---|
| 3,729,690 | 4/1973 | Snitzer | 372/6 X |
| 4,015,217 | 3/1977 | Snitzer | 372/6 X |
| 4,044,315 | 8/1977 | Snitzer | 372/6 X |
| 4,782,491 | 11/1988 | Snitzer | 372/6 |
| 4,955,025 | 9/1990 | Mears et al. | 372/6 |
| 5,253,322 | 10/1993 | Onishi et al. | 385/142 |
| 5,309,452 | 5/1994 | Ohishi et al. | 372/6 |
| 5,379,149 | 1/1995 | Snitzer et al. | 359/341 |
| 5,392,376 | 2/1995 | Aitken et al. | 385/144 |
| 5,568,497 | 10/1996 | Bishop et al. | 372/40 |
| 5,727,007 | 3/1998 | Smart et al. | 372/6 |
| 5,772,915 | 6/1998 | Jha et al. | 372/6 |
| 5,930,436 | 7/1999 | Okamura et al. | 385/127 |

FOREIGN PATENT DOCUMENTS

| | | | |
|---|---|---|---|
| 0 631 353 | 12/1994 | European Pat. Off. | 372/6 X |
| 2-18336 | 1/1990 | Japan | 372/6 X |
| 10-270785 | 10/1998 | Japan | 372/6 X |
| WO 97/03028 | 1/1997 | WIPO | 372/6 X |
| WO 98/54607 | 12/1998 | WIPO | 372/6 X |

*Primary Examiner*—Brian Healy
*Attorney, Agent, or Firm*—Robert E. Bushnell, Esq.

[57] ABSTRACT

A Ge—Ga—S-based glass composition for performing an optical amplification and an apparatus for optical communications using the same are provided. In the glass composition according to the present invention, an active material for performing luminescence and optical amplification operations is added to the Ge—Ga—S host glass and a transition metal ion moving the distribution of optical amplification gains is added in a range from 0.01 mole % to 0.2 mol %.

28 Claims, 4 Drawing Sheets

GE-GA-S-BASED GLASS COMPOSITION HAVING LIGHT AMPLIFYING CHARACTERISTIC AND APPARATUS FOR OPTICAL COMMUNICATIONS USING THE SAME

CLAIM OF PRIORITY

This application makes reference to, incorporates the same herein, and claims all benefits accruing under 35 U.S.C. §119 from an application for Ge—Ga—S-BASED GLASS COMPOSITION HAVING LIGHT AMPLIFYING CHARACTERISTIC AND APPARATUS FOR OPTICAL COMMUNICATIONS USING THE SAME earlier filed in the Korean Industrial Property Office on Nov. 4, 1997 and there duly assigned Serial No. 57995/1997.

BACKGROUND OF THE INVENTION

1. Field of the Invention

The present invention relates to a glass composition used in an optical device, and more particularly, to a glass composition for an optical fiber used in light amplification. The invention also relates to an apparatus for optical communication using the glass composition.

2. Description of the Related Art

An optical device material used in a light source such as a single wavelength laser oscillator used for optical communications, a superluminescent source of light, and an optical amplifier has been developed. However, an optical fiber compatible with amplifying a 1.3 $\mu$m wavelength signal, which is the zero dispersion waveband of silica glass, has not been successfully developed.

In making one type of an optical fiber used for amplification of a 1.3 $\mu$m wavelength signal, two rare earth elements are used as the active material. Neodymium (Nd) or praseodymium (Pr) is doped on a host glass to make a glass composition. By way of definition, glass which is not doped with an active material will be referred to as host glass. A glass composition represents host glass doped with an active material. In this case, the rare earth element is doped in an ion state, such as $Nd^{3+}$ or $Pr^{3+}$ ion, on a host glass such as silica glass.

However, when the $Pr^{3+}$ ion is excited and emits light, the energy of the $Pr^{3+}$ ion in a glass composition can be relaxed by a lattice vibration of the host glass, for example, in host glass made of silica. Since the optical amplification efficiency decreases as the probability of generating the relaxation becomes higher, a material having a low lattice vibration energy is required to decrease the probability of relaxation.

A three-component system glass composed of sulfur-rich Ge, Ga, and S can be used as a host glass having the low lattice vibration energy, as disclosed in U.S. Pat. No. 5,379,149, to Snitzer et al., entitled Glass Composition Having Low Energy Phonon Spectra And Light Sources Fabricated Therefrom. The patent discusses a host glass having a composition in which excess S is added in a ratio higher than S ratio on a composition line which connects $GeS_2$ and $Ga_2S_3$ in a ternary system phase diagram of germanium (Ge), gallium (Ga) and sulfur (S). This is referred to as a sulfur-rich glass. However, the center of the optical gain distribution of the glass composition made using this host glass and $Pr^{3+}$ as active material is located at a 1,330 nm bandwidth. Therefore, a low optical gain is obtained in a 1,310 nm bandwidth which is the required optical communications bandwidth. Accordingly, the optical amplification efficiency is remarkably reduced.

The central wavelength of the optical gain distribution is determined by the difference of energy between a $^1G_4$ state which is an excited state of the $Pr^{3+}$ ion and a $^3H_5$ state which is a metastable state. Such a difference of energy is smaller in a sulfide host glass than in an oxide host glass. Therefore, in the sulfide host glass, the central wavelength of the optical gain distribution is nearer to 1,310 nm which is the desired optical communications waveband.

Based on our observation of the art, then, we have found that what is needed is a glass composition which has a low lattice vibration energy and which has a high optical gain at the 1,310 nm bandwidth. Such a glass composition would have excellent optical amplification properties.

SUMMARY OF THE INVENTION

It is therefore an object of the present invention to provide an improved glass composition for optical applications.

It is a further object to provide an improved glass composition for optical communications.

Is a still further object of the present invention to provide an improved glass composition for use in light amplification and luminescence applications.

It is a yet further objects to provide a glass composition with improved optical amplification efficiency.

It is a still yet further object to provide a glass composition which has a high optical gain at a bandwidth of 1,310 nm.

It is an even further object of the present invention to provide a glass composition based on Ge—Ga—S in which the central wavelength of amplified radiation can be adjusted to increase the optical amplification efficiency.

It is yet another object to provide an apparatus for optical communications offering improved optical amplification efficiency using the glass composition of the present invention.

Accordingly, there is provided a glass composition, comprising a host glass, an active material added to the host glass for performing luminescence and optical amplification operations, and a transition metal ion added to the host glass which changes the distribution of optical amplification gains. The host glass is a Ge—Ga—S glass. The active material is a lanthanum rare earth ion. The lanthanum rare earth ion is a $Pr^{3+}$ ion. It is preferable that the transition metal ion does not have an energy level absorbing a 1310 nm waveband. It is more preferable that the transition metal ion does not have an energy level absorbing a 1017 nm waveband. The transition metal ion is preferably a $Pd^{4+}$ ion, an $Ag^+$ ion or a $Cu^+$ ion; more preferably it is $Cu^+$. The transition metal ion is included in the host glass in a range from approximately 0.01 mol % to 0.2 mol %.

In addition, there is provided an apparatus for optical communications, comprising means for generating an optical signal and an optical pumping and providing them to optical fiber, optical fiber comprised of a host glass, an active material added to the host glass and performing luminescence and optical amplification operations, and a transition metal ion added to the host glass and changing the distribution of optical amplification gains, and means for preventing the light emitted from the optical fiber from being reflected back to the optical fiber. The host glass is preferably a Ge—Ga—S glass. The active material is preferably a lanthanide rare earth ion, preferably a $Pr^{3+}$ ion. It is preferable that the transition metal ion does not have an energy level absorbing the 1310 nm waveband. It is more preferable that the transition metal ion does not have an energy level absorbing a 1017 nm waveband. The transition metal ion is a $Pd^{4+}$ ion, an $Ag^+$ ion or a $Cu^+$ ion. The transition metal ion is included in the host glass in a range from approximately 0.01 mol % to 0.2 mol %.

The means for generating the optical signal and the optical pumping and supplying them to the optical fiber comprises sub-means for generating the optical signal and the optical pumping and a coupler for coupling the optical signal and the optical pumping. The means for preventing the light from being reflected back to the optical fiber comprises a Faraday isolator.

Thus, according to the present invention, it is possible to increase the optical gain cross-sectional area at the waveband of 1,310 nm and to improve the optical amplification efficiency at the waveband of 1,310 nm.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
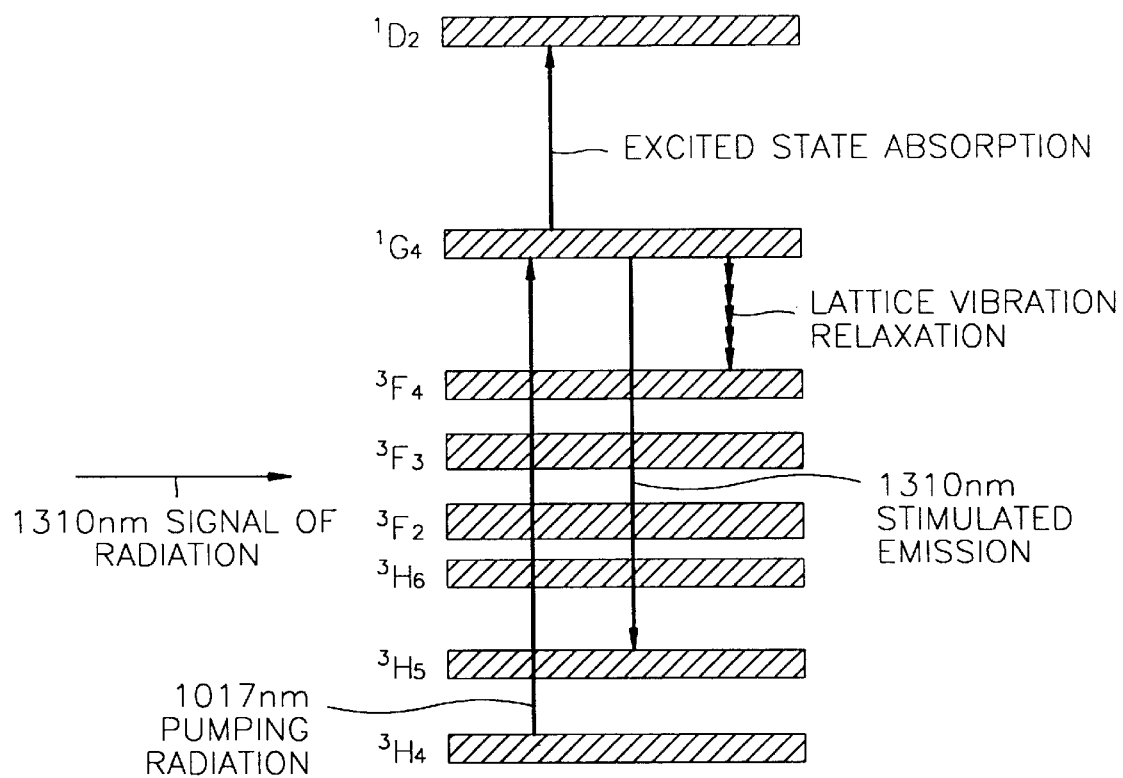
FIG. 1 schematically shows the energy level diagram of a $Pr^{3+}$ ion.

Hereinafter, embodiments of the present invention will be described in detail with reference to the attached drawings. However, the present invention is not restricted to the following embodiments and many variations are possible within the scope and spirit of the present invention by anyone skilled in the art. The elements marked with the same reference numerals are the same.

A glass composition having luminescence and optical amplification characteristics according to the present invention includes a host glass, an active material added to the host glass and performing luminescence and optical amplification, and a transition metal ion added to the host glass in a range of 0.01 mol % to 0.2 mol %. A Ge—Ga—S-based glass is used as the host glass. The active material includes a rare earth ion, more preferably, a lanthanide family-rare earth ion, i.e., an ion of an element from cerium (Ce, atomic number 58) to ytterbium (Yb, atomic number 70) of the periodic table. More preferably, the $Pr^{3+}$ ion is used. As this ion has a large radius the transition metal addition effect is more marked. The transition metal ion moves an optical amplification gain distribution. $Cu^+$, $Pd^{4+}$ or $Ag^+$ ion are preferably used as the transition metal ion. It is more preferable that a $Cu^+$ ion is used as the transition metal ion.

Referring to FIG. 1, when an optical signal of about 1310 nm and an optical pumping of about 1017 nm are incident on the Ge—Ga—S-based glass composition including the $Pr^{3+}$ ion, electrons of the $Pr^{3+}$ ion are excited from a $^3H_4$ state to a $^1G_4$. Light of about 1310 nm wavelength is generated by the transmission of electrons between the excited $^1G_4$ state and a lower energy state $^3H_5$. However, a lattice vibration relaxation due to the lattice vibration of the host glass doped with the $Pr^{3+}$ ion, i.e., the Ge—Ga—S-based host glass and the absorption of an excited state from the excited $^1G_4$ state to a higher $^1D_2$ state may occur. The optical amplification efficiency is reduced due to the lattice vibration relaxation and the absorption of the excited state. In order to use the Ge—Ga—S-based glass composition including $Pr^{3+}$ ion, a higher optical amplification efficiency is required.

The following method is provided in the present embodiment for increasing the optical amplification efficiency. Namely, the center of the optical gain distribution of the wavelength generated by the transmission between the $^1G_4$ state and the $^3H_5$ state is moved to the 1310 nm wavelength. The transition metal ion is added in order to move the center of the optical gain distribution to the 1310 nm wavelength.

To be more specific, the wavefunction of the $4f^2$ orbital electron of the $Pr^{3+}$ ion is concentrated at the center of the $Pr^{3+}$ ion. Also, the wave function participating in the combination of the $Pr^{3+}$ ion with a ligand is mainly distributed to the outer shell of the $Pr^{3+}$ ion. Therefore, the central $4f^2$ orbital electron and the coupled electron are shielded by the electrons of another closed orbit of the $Pr^{3+}$ ion. Therefore, even if the chemical combination characteristic of the host glass doped with the $Pr^{3+}$ ion is changed, this change hardly affects the wave function and the energy state of the $4f^2$ orbital electron of the $Pr^{3+}$ ion. Even if an alkali or alkaline earth metal ion such as a sodium ($Na^+$) ion or a calcium ($Ca^{++}$) ion is added in a glass as a network modifier of the glass, the added metal hardly affects the energy state of the $4f^2$ orbital electron of the $Pr^{3+}$ ion.

However, a transition metal ion having a $3d^n$ or $4d^n$ is added to the host glass in the present embodiment. The wave function of the $3d^n$ or $4d^n$ orbital electron is largely expanded to the outer shell of the transition metal. Therefore, the transition metal ion can remarkably affect the $4f^2$ orbital electron of the $Pr^{3+}$ ion. For example, a repulsive force between the $4f^2$ orbital electrons of the $Pr^{3+}$ ion increases due to the interaction between the transition metal ion and the $Pr^{3+}$ ion. Also, a partial covalent bond between the $Pr^{3+}$ ion and the ligand is reduced. Therefore, the difference in energy between the excited state $^1G_4$ and the metastable state $^3H_5$ of the $Pr^{3+}$ ion increases.

The amount of the transition metal ion added to the host glass, for example the Ge—Ga—S host glass, doped with rare earth ion is not more than the solid solubility of the transition metal ion. When the amount of the added transition metal ion is not less than the solid solubility of the transition metal ion included in the host glass, the included transition metal ion can be precipitated as a fine crystal. The precipitated fine crystal scatters the optical signal, thus increasing optical loss. Therefore, the amount of the added transition metal ion is controlled to be less than the solid solution limit of the host glass.

Furthermore, the transition metal ions having an energy state which absorbs the wavelength of 1310 nm waveband required by the optical amplification apparatus for optical communications are preferably excluded since they are not related to the object of the present embodiment. Furthermore, a transition metal ion absorbing the optical pumping, i.e., the wavelength of 1017 nm waveband is preferably excluded. A $Cu^+$ ion, a palladium ($Pd^{4+}$) ion, or a silver ($Ag^+$) ion is preferably used as the transition metal ion according to the present invention, as these meet the above conditions.

More preferably, the $Cu^+$ ion is added. The $Cu^+$ ion can be added to the Ge—Ga—S host glass doped with the rare earth ion, for example, the $Pr^{3+}$ ion to the solid solution limit. For example, up to about 0.2 mol % of $Cu^+$ ion is added to the host glass. The added transition metal ion, for example, the $Cu^+$ ion increases the difference in energy between the excited state $^1G_4$ and the metastable state $^3H_5$. Accordingly, the distribution of the optical gain of the optical amplification by the transition is changed. Namely, the center of the optical gain distribution moves to the 1310 nm waveband. Accordingly, it is possible to increase the optical amplification efficiency in the 1310 nm waveband.

Hereinafter, the above-mentioned optical amplification efficiency of the host glass according to the present invention will be described in detail with reference to the following experimental example. The optical characteristics of glass compositions according to the present invention were measured and analyzed by the following method. Stated below is a method used for preparing s a sample of a glass composition according to the present invention for optical characterization. However, preparation methods for the glass composition according to the present invention are not limited to this method and a general glass manufacturing technology can be used.

In the present experimental example, the Ge—Ga—S-based host glass doped with the active material was used. For this example, a host glass $Ge_{25}Ga_5S_{70}$ having an excellent vitrification characteristics and chemical durability among the Ge—Ga—S host glasses was used. Although any kind of rare earth ion can be used as the active material, the $Pr^{3+}$ ion which is a representative case in which the waveband is to be moved was used as the active material. The $Pr^{3+}$ ion can be added to a level of about 20 mol %. However, about 0.1 mol % of $Pr^{3+}$ ion was added, an appropriate level for an optical communications device.

The transition metal ion added to the host glass together with the rare earth ion, in this example, the $Cu^+$ ion, can be added to the solid solution limit with respect to the host glass. Here, levels of up to about 0.2 mol % of $Cu^+$ ion was added. The optical characteristics of three glass composition samples to which 0.05 mol %, 0.10 mol %, and 0.15 mol % of $Cu^+$ ions were respectively added were compared with the optical characteristic of the glass composition to which only the active material, the 0.1 mol % of $Pr^{3+}$ ion, was added.

Figure 2:
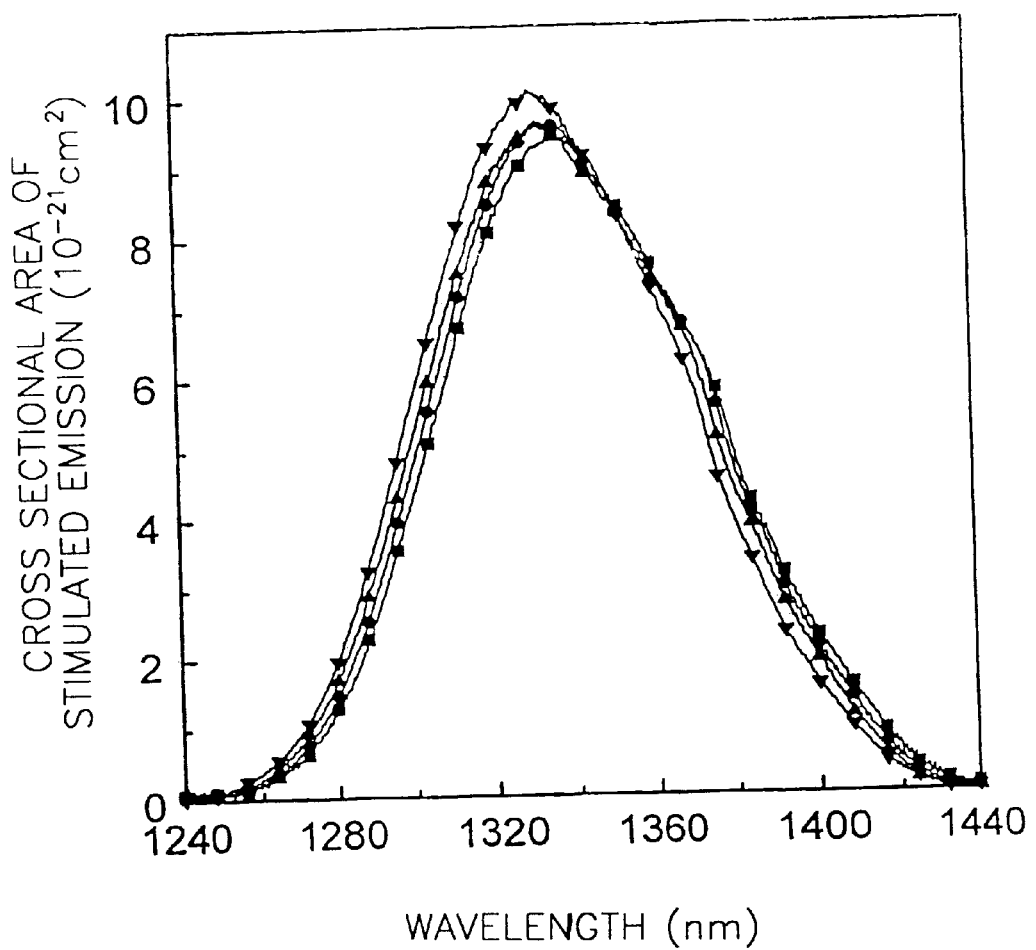
FIG. 2 is a graph showing the cross-sectional areas of the stimulated emission as a function of wavelength of exemplary glass compositions of $Ge_{25}G_5S_{70}$ including 0.1 mol % $Pr^{3+}$ and varying amounts of $Cu^+$ ion.
Figure 3:
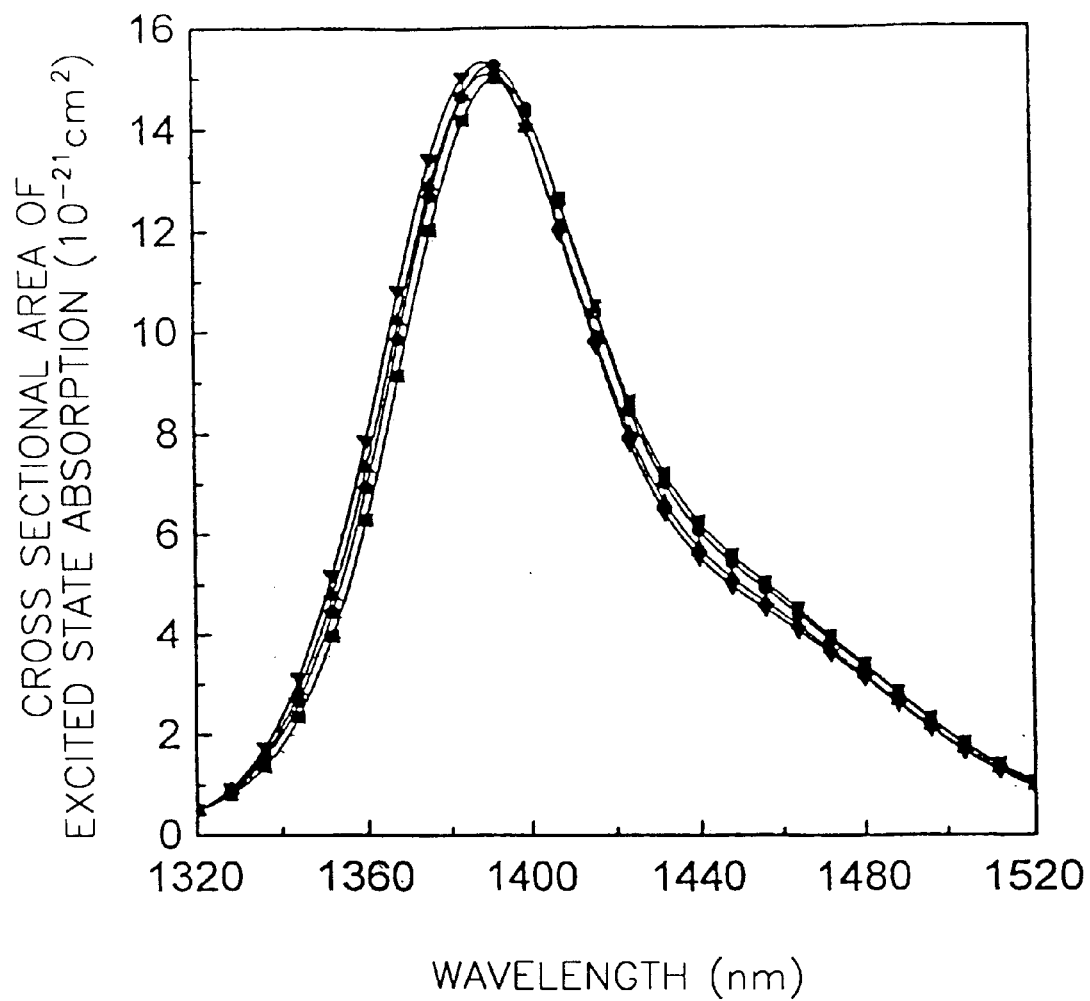
FIG. 3 is a graph showing cross-sectional areas of excited state absorption as a function of wavelength of exemplary glass compositions of $Ge_{25}G_5S_{70}$ including 0.1 mol % $Pr^{3+}$ and varying amounts of $Cu^+$ ion.
Figure 4:
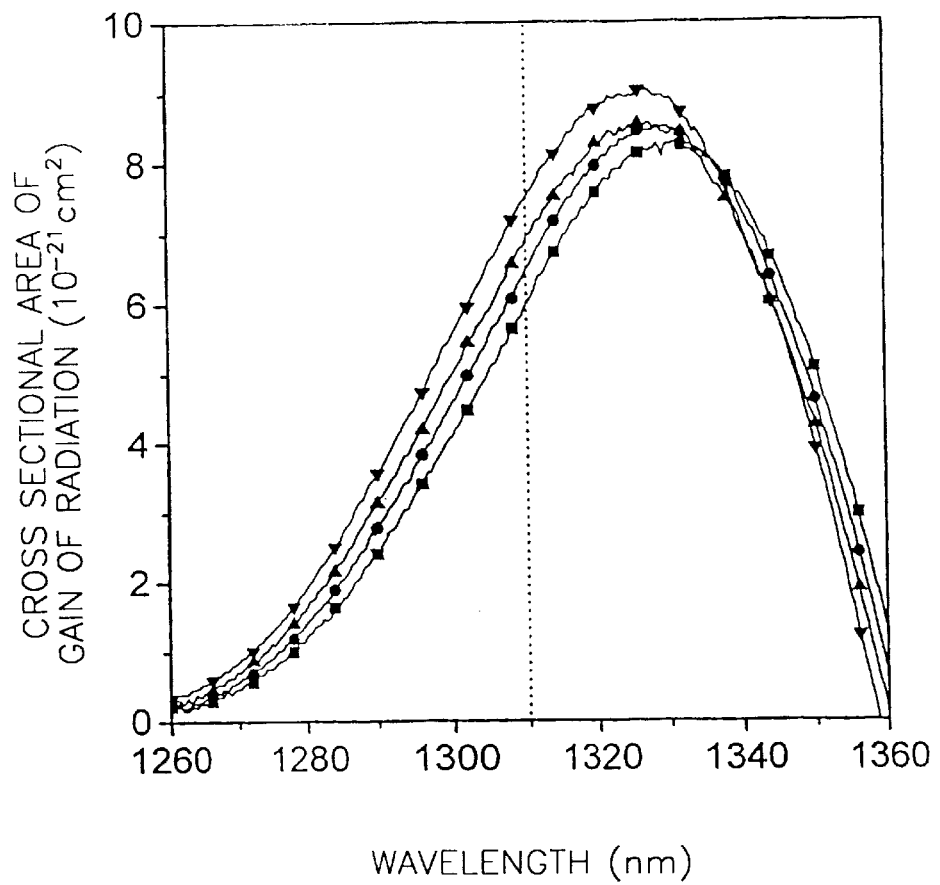
FIG. 4 is a graph showing cross-sectional areas of gain of radiation as a function of wavelength of exemplary glass compositions of $Ge_{25}G_5S_{70}$ including 0.1 mol % $Pr^{3+}$ and varying amounts of $Cu^+$ ion.

In FIGS. 2, 3, and 4, the curve designated by ■ shows a case in which the 0.1 mole % of $Pr^{3+}$ ion was added to the host glass $Ge_{25}Ga_5S_{70}$. The curve designated by ● shows a case in which the 0.1 mol % of $Pr^{3+}$ ion and 0.05 mole % of $Cu^+$ ion were added to the host glass. The curve designated by ▲ shows a case in which 0.1 mol % of $Pr^{3+}$ ion and 0.1 mol % of $Cu^+$ ion were added to the host glass. The curve designated by ▼ shows a case in which the 0.1 mol % of $Pr^{3+}$ ion and the 0.15 mol % of $Cu^+$ ion were added to the host glass.

FIG. 2 shows the results of measuring stimulated emission cross-sectional areas as a function of the wavelength, of the respective glass compositions. It is noted from the result of FIG. 2 that the central wavelength of the distribution of the stimulated emission cross sectional areas is reduced as the amount of the $Cu^+$ increases. Therefore, as the central wavelength of the distribution of the stimulated emission cross-sectional areas is reduced, it is possible to increasethe stimulated emission cross-sectional area at the 1310 nm waveband.

FIG. 3 shows the result of measuring excited state absorption cross-sectional areas as a function of the wavelength, of the respective glass compositions. FIG. 3 indicates that the central wavelength of the distribution of the excited state absorption cross-sectional areas hardly moves even though the amount of the $Cu^+$ added increases. Therefore, it can be concluded that the excited state absorption due to the added transition metal ion, i.e., the $Cu^+$ ion is not generated. This means that the transition metal does not increase the non-radiative transition.

FIG. 4 shows the result of calculating the optical gain cross-sectional area as a function of the wavelength, for the respective glass compositions. The wavelength distribution of the optical gain cross-sectional areas is obtained from the results of FIGS. 2 and 3. Namely, the optical gain cross-sectional area is calculated from the difference between the stimulated emission cross-sectional area shown in FIG. 2 and the excited state absorption cross-sectional area. As the amount of $Cu^+$ increases as seen in FIG. 4, the wavelength corresponding to the maximum value of the optical gain cross-sectional area is moved from a 1330 nm waveband to 1325 nm waveband. In particular, the respective optical gain cross-sectional areas at the 1310 nm waveband used as the optical communications waveband are shown in Table 1.

TABLE 1

Optical gain cross-sectional areas of 1310 nm waveband according to the amount of $Cu^+$ ions added.

| Amount of added $Cu^+$ ion | Optical gain cross sectional areas at the 1310 nm waveband ($\times 10^{-21}$ cm$^2$) |
| --- | --- |
| 0.00 mole % | 5.996 |
| 0.05 mole % | 6.502 |
| 0.1 mole % | 6.948 |
| 0.15 mole % | 7.521 |

Referring to FIG. 4 and Table 1, the respective optical gain cross-sectional areas at the 1310 nm waveband used as the optical communications waveband increase as the amount of the $Cu^+$ ions added increases. In particular, when 0.15 mol % of $Cu^+$ ions are added, the optical gain cross-sectional areas at the 1310 nm waveband increased about 25% with respect to the case where $Cu^+$ ions are not added.

As shown from the above result, in the glass composition comprised of the Ge—Ga—S host glass, the transition metal ion, for example, the $Cu^+$ ion, and the active material such as the rare earth ion, the waveband corresponding to the center of the optical gain distribution can be moved to a waveband around 1325 nm without optical transmission loss of the incident optical signal. Therefore, it is possible to increase the optical gain cross-sectional area at the 1310 nm waveband and to effectively improve the optical amplification efficiency at the 1310 nm waveband.

Figure 5:
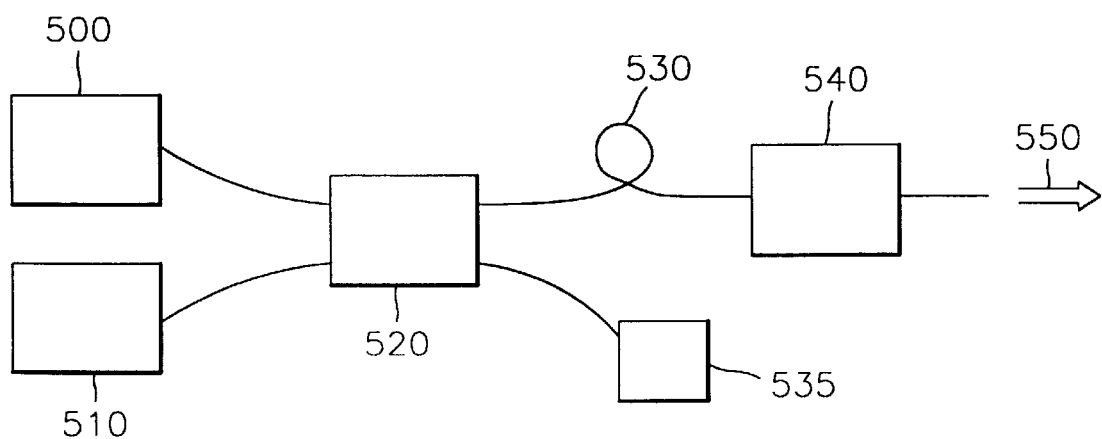
FIG. 5 schematically shows an optical amplifier using the glass composition according to the present invention as optical fiber.

FIG. 5 schematically shows the optical amplification apparatus using the glass composition according to the present invention. Hereinafter, the optical amplifier for optical amplification will be described as an embodiment of an optical apparatus employing the glass composition according to the present invention. However, the present invention is not restricted to this embodiment. Therefore, the glass composition according to the present invention can be applied to a light source such as a laser oscillator and a luminescence apparatus.

To be specific, the optical amplifier according to the present invention includes means 500, 510, and 520 for generating the optical pumping and the optical signal and providing the light to optical fiber 530, optical fiber 530 being comprised of the glass composition according to the present invention, and means 540 for preventing the light emitted from optical fiber 530 from being re-reflected back to optical fiber 530.

The optical signal supplied from signal source 500 and the optical pumping supplied from laser source 510, for example, the optical pumping light having a wavelength of about 1017 nm waveband are combined and coupled in dispersive coupler 520. The combined and coupled radiation is supplied to optical fiber 530. At this time, some of the radiation combined and coupled in dispersive coupler 520 is allotted to monitor 535 so that the radiation is monitored. The remaining light, about 90%, is incident on optical fiber 530. Also, a Faraday isolator is used as means 540 for preventing the light emitted from optical fiber 530 from being reflected back to optical fiber 530. Light 550 which passes through optical fiber 530 and Faraday isolator 540 lies within the 1310 nm waveband.

According to the above-mentioned present invention, it is possible to increase the optical gain cross-sectional area in the 1310 nm waveband by adding a transition metal ion such as the $Cu^+$ ion to the Ge—Ga—S-based glass composition to which the active material such as the rare earth ion is added. Therefore, it is possible to effectively improve the optical amplification efficiency at the 1310 nm waveband used in optical communications.

The present invention is not restricted to the above embodiments, and it is clearly understood that many variations are possible within the scope and spirit of the present invention by anyone skilled in the art.

What is claimed is:

1. An apparatus for optical communication, comprising:
   an optical fiber comprising a glass composition, said glass composition comprising:
   a host glass;
   an active material for light amplification; and
   a transition metal ion;
   means for generating an optical signal and an optical pumping;
   means for providing said optical signal and said optical pumping to said optical fiber; and
   means for preventing light emitted from said optical fiber from being reflected back to said optical fiber.

2. The apparatus of claim 1, where said host glass consists essentially of Ge, Ga and S.

3. The apparatus of claim 1, where said active material comprises a lanthanide rare earth ion.

4. The apparatus of claim 3, where said lanthanide rare earth ion is $Pr^{3+}$.

5. The apparatus of claim 1, where said transition metal ion in the glass composition does not substantially absorb light of wavelength 1310 nm.

6. The apparatus of claim 1, where said transition metal ion in the glass composition does not substantially absorb light of wavelength 1017 nm.

7. The apparatus of claim 1, further comprising that the presence of said transition metal ion increases the optical gain cross-sectional area of said active material in the glass composition.

8. The apparatus of claim 1, where said transition metal ion is the $Pd^{4+}$ ion.

9. The apparatus of claim 1, where said transition metal ion is the $Ag^+$ ion.

10. The apparatus of claim 1, where said transition metal ion is the $Cu^+$ ion.

11. The apparatus of claim 1, where said transition metal ion is present in a range of approximately 0.01 mol % to 0.2 mol % relative to said host glass.

12. The apparatus of claim 1, further comprising a coupler for said optical signal and said optical pumping.

13. The apparatus of claim 1, where said means for preventing light emitted from said optical fiber from being reflected back to said optical fiber comprises a Faraday isolator.

14. A glass composition for an optical device, comprising:
    a host glass;
    an active material for light amplification; and
    a transition metal ion dissolved in the host glass within the solubility limit, said transition metal ion selected from the group consisting of the elements of group 8 and the elements of group 1B of the periodic table, for increasing the optical gain cross-sectional area of the active material.

15. The glass composition of claim 14, said host glass consisting essentially of Ge, Ga and S.

16. The glass composition of claim 14, said active material comprising a lanthanide rare earth ion.

17. The glass composition of claim 16, said lanthanide rare earth ion being a $Pr^{3+}$ ion.

18. The glass composition of claim 14, said transition metal ion in the glass composition not substantially absorbing light of wavelength 1310 nm.

19. The glass composition of claim 14, said transition metal ion in the glass composition not substantially absorbing light of wavelength 1017 nm.

20. The glass composition of claim 14, said transition metal ion being the $Pd^{4+}$ ion.

21. The glass composition of claim 14, the transition metal ion being present in a range of approximately 0.01 mol % to 0.2 mol % relative to said host glass.

22. A glass composition for an optical device, comprising:
    a host glass;
    an active material for light amplification; and
    copper ion dissolved in the host glass within the solubility limit, for increasing the optical gain cross-sectional area of the active material.

23. The glass composition of claim 22, said host glass consisting essentially of Ge, Ga and S.

24. The glass composition of claim 22, said active material comprising a lanthanide rare earth ion.

25. The glass composition of claim 24, said lanthanide rare earth ion being a $Pr^{3+}$ ion.

26. The glass composition of claim 22, said copper ion in the glass composition not substantially absorbing light of wavelength 1310 nm.

27. The glass composition of claim 22, said copper ion in the glass composition not substantially absorbing light of wavelength 1017 nm.

28. The glass composition of claim 22, the copper ion being present in a range of approximately 0.01 mol % to 0.2 mol % relative to said host glass.

* * * * *